April 19, 1960     C. D. NESTLERODE ET AL     2,932,980

DETENT MECHANISM

Filed Aug. 28, 1956

INVENTOR.
C. DALE NESTLERODE
BY    DAVID COAN FELT

Darby + Darby

ATTORNEYS

United States Patent Office 2,932,980
Patented Apr. 19, 1960

2,932,980

DETENT MECHANISM

Clifford Dale Nestlerode, Packanack Lake, and David Coan Felt, Bergenfield, N.J., assignors to Allen B. Du Mont Laboratories, Inc., Clifton, N.J., a corporation of Delaware Application August 28, 1956, Serial No. 606,752

7 Claims. (Cl. 74—527)

This invention relates to detent mechanisms.

When a rotatable shaft, disc, or drum must achieve precise reproducible positions, a detent mechanism must be utilized. This situation occurs in radio and television equipment and in other mechanical devices. Many prior-art detent mechanisms depended upon a ball fitting into a socket. Each of these elements required manufacturing tolerances, and their assembly frequently introduced appreciable backlash. The backlash could be eliminated by reducing the tolerances (a costly operation), or by utilizing a strong spring. The disadvantage of the spring was that it required a large force to disengage the detent mechanism.

It is therefore the principal object of our invention to provide an improved detent mechanism.

It is another object to provide a detent mechanism having no backlash, and being precisely repositionable.

It is a further object of our invention to provide a detent mechanism which is easily disengaged.

These objects and others will be realized from the following specification, taken in conjunction with the drawings, of which:

Figure 1:
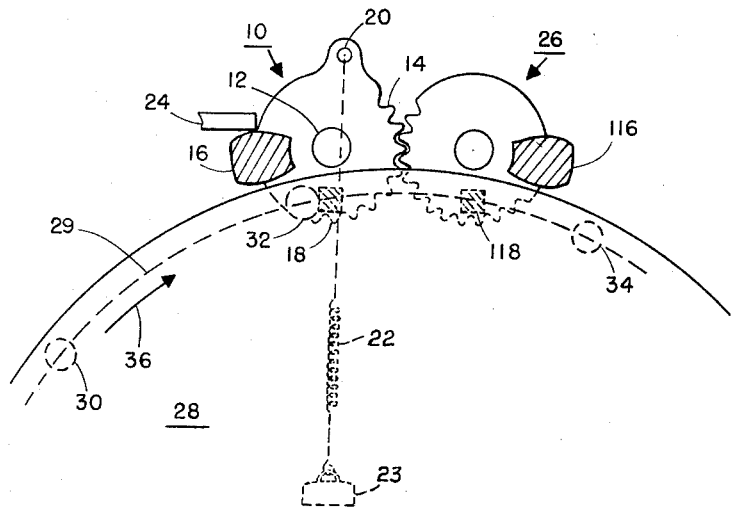
Fig. 1 illustrates our detent mechanism at the point of being energized.

Referring now to Fig. 1, there is illustrated a pawl or gear member 10 which rotates about shaft 12. The pawl has gear teeth 14, a pinching pad 16, and a striking pad 18. An eye 20 receives one end of a tension device 22, illustrated as a helical tension spring which is anchored as shown. However, other devices, including compression springs, may be readily utilized. When eye 20, shaft 12, and the spring anchoring device 23 are in a straight line the pawl is in a position described as "dead-center," at which point it is in unstable equilibrium-tending to rotate in one direction or the other. The quiescent position of pawl 10 shown in Fig. 1 is achieved by means of stop 24 which prevents spring 22 from rotating pawl 10 any further in a clockwise direction.

A second pawl 26 is similar to the first pawl 10 except that it has no spring or attaching means therefor. As shown, the gear teeth are engaged so that the two pawls rotate in opposite directions.

A shaft, drum, or disc, identified by reference character 28 has engaging pins such as 30, 32, and 34. The line of action of these pins is circumferentially around disc 28 as shown by dashed line 29.

In use, disc 28 is rotated by hand or any other suitable means until an engaging pin such as 32 abuts striking pad 18, which is positioned on the line of action of pin 32. Further movement of pin 32 in the direction of arrow 36 moves striking pad 18, thus causing pawl 10 to rotate counter-clockwise about shaft 12 until eye 20 has passed the dead-center position. At this point, spring 22 produces a "toggle-action" which energizes pawl 10 to rotate strongly in a counter-clockwise direction. Pinching pad 16 rotates to strike the backside of pin 32 and move it further along its line of action. Simultaneously, gear teeth 14 cause pawl 26 to rotate in a clockwise direction. The symmetrical rotation of the two pawls cause pinching pads 16 and 116 to converge upon pin 32 from opposite directions, and to hold it securely in place, as shown in Fig. 2.

It will be seen from Fig. 1 that if disc 28 were originally rotated counter-clockwise, pin 34 would hit striking pad 118 and initiate the same action as described above.

Figure 2:
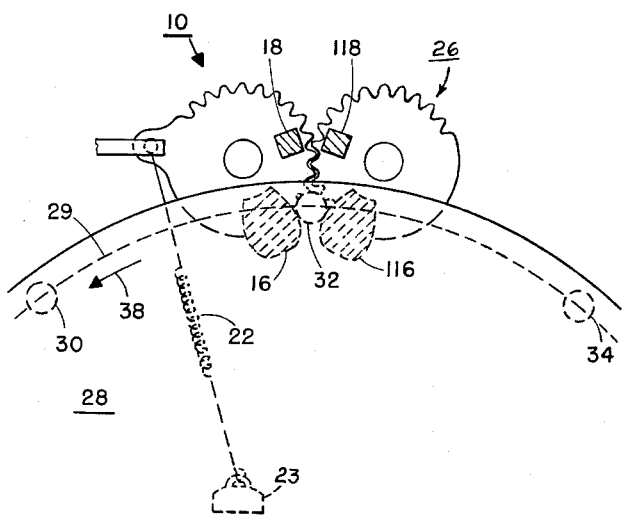
Fig. 2 illustrates our detent mechanism in its "hold" position.

The operation of disengagement may be seen by referring to Fig. 2. If disc 28 is rotated counter-clockwise, as indicated by arrow 38, the movement of pin 32 against pinching pad 16 will cause pawl 10 to rotate in a clockwise direction until it reaches its dead-center position, at which time spring 22 would force pawl 10 to rotate still further until its motion is limited by stop 24 of Fig. 1. This rotation would raise pinching pad 16 above the line of movement of pin 32, which would then be free to continue its motion.

It will be seen from Fig. 2 that if disc 28 were rotated in a clockwise direction, pin 32 would move pinching pad 116, and achieve exactly the same disengaging action as has been described.

It will be understood that if pawl 26 were replaced by a fixed pinching pad, a single pin of disc 28 could be engaged or disengaged. The use of pawl 26 and pinching pad 116, without striking pad 118, would allow any number of pins to be used but would restrict the rotation of disc 28 to a counterclockwise direction. The use of two similar pawls, each having pinching pads and striking pads, permits the use of a plurality of energizing pins, and permits either clockwise or counter-clockwise rotation of disc 28.

It will be understood that the pawls and the pads may be of unitary or separate structure, and of any suitable material or combination of materials. In addition, the operation as described, may be used for rectilinear motion of the energizing means as well as rotational movement. Another advantage accrues because of the symmetry of the device; namely, wear of the gears or of the pads is uniform and opposite, and therefore the energizing pins will be securely locked in the same position even after much usage.

Having described the principles and one embodiment of our invention, we desire to be limited not by the foregoing description and example, but rather by the claims granted to us.

What is claimed is:

1. A detent mechanism comprising: a disk-like body to be held in a predetermined angular position, said body having an engaging pin affixed thereto, said pin moving along a given path; a first pivoted gear member having a shaft, an eye, gear teeth, a striking pad, and a pinching pad, the shaft of said first gear member being positioned so that said pads move along a portion of said given path; a second pivoted gear member having a second shaft, gear teeth, a second striking pad, and a second pinching pad, the shaft of said second gear member being positioned so that said second pads move along a second portion of said given path, and so that said teeth of said gear members are engaged; a spring having one end thereof affixed to said eye of said first gear member, and having the other end thereof affixed to a spring anchoring device; a stop motion device positioned so that when said stop motion device is operative the line between said eye and said anchoring device does not pass through said first shaft, whereby said first member has a dead center position but is positioned off said dead center position, whereby when said body is moved so that said engaging pin strikes one of said striking pads and causes said first member to be rotated past its dead center position, said spring causes said first member to continue its rotation until said first pinching pad presses against and moves said engaging pin along said given path, said second member meanwhile being rotated by the engaged gear teeth so that its pinching pad approaches said pin from the opposite direction and thus both pinching pads converge upon said pin and hold said pin and said body in a predetermined position.

2. A detent mechanism comprising: a circular body to be held in a predetermined position, said body having an engaging pin affixed thereto, said pin moving along a given path; a first pivoted gear member having a shaft, a striking pad, and a pinching pad, the shaft of said first gear member being positioned so that said pads move along a portion of said given path; a second pivoted gear member having a shaft, a second striking pad, and a second pinching pad, the shaft of said second gear member being positioned so that said second pads move along a portion of said path; means to counter-rotate said gear members; toggle means energized when one of said striking pads rotates one of said members a given distance, causing said members to counter-rotate until said pin is pinched between said pinching pads.

3. A detent mechanism comprising: a body to be held in a predetermined position, said body having an engaging pin mounted thereon, said pin moving along a given path; a pivoted gear member having a shaft, a striking pad, and a pinching pad, the shaft of said gear member positioned so that said pads move along a portion of said given path; means for supporting and positioning a second pinching pad on said path; toggle means establishing a dead center position for said first member whereby when said member is rotated past its dead center position said toggle means causes said member to continue its rotation until said pinching pad presses against and impels said engaging pin along said given path toward said second pinching pad, whereby said pin is pinched between said pinching pads to hold said pin and said body in said predetermined position.

4. A detent mechanism comprising: a body having an engaging pin to be held in a predetermined position, said pin moving along a given path; a pivoted gear member having a shaft and a pinching pad, the shaft of said gear member positioned so that said pad moves along a portion of said given path; means for supporting and positioning a second pinching pad on said path; and toggle means causing said gear member to rotate so that said first pinching pad urges said pin toward said second pinching pad whereby said pin is pinched between said pads to hold said pin in said predetermined position.

5. In a detent mechanism, the combination comprising: a body movable along a predetermined path and adapted to be held in a predetermined position, said body having an engaging pin mounted thereon; a first rotatable member having a striking pad and a pinching pad mounted thereon at spaced points on the circumference thereof, said member being rotatably mounted in such a position that said pads move into the path of said engaging pin; a stop mounted to position said striking pad on said path; a second rotatable member having a second striking pad and a second pinching pad mounted thereon at spaced points on circumference thereof, said second member being rotatably mounted in such a position that said second pads move into the path of said engaging pin; means causing said rotatable members to rotate simultaneously in opposite directions; and toggle means for causing said members to continue to rotate, after initial rotation under urging of said engaging pin on either of said striking pads, to pinch said pin between said pinching pads.

6. In a detent mechanism the combination comprising: a body movable along a predetermined path and adapted to be held in a predetermined position, said body having an engaging pin mounted thereon; a first rotatable member having a striking pad and a pinching pad mounted thereon at spaced points on the circumference thereof, said member being rotatably mounted in such a position that said striking and pinching pads move into the path of said engaging pin; a stop mounted to position said striking pad on said path; a second rotatable member having a second pinching pad mounted on the circumference thereof, said second member being rotatably mounted in position such that said second pinching pad moves into the path of said engaging pin; means causing said rotatable members to rotate simultaneously in opposite directions; and toggle means for causing said members to continue to rotate, after initial rotation under urging of said engaging pin, to pinch said pin between said pinching pads.

7. In a detent mechanism, the combination comprising: a body movable along a predetermined path and adapted to be held in a predetermined position, said body having an engaging pin mounted thereon; a first rotatable member having a striking pad and a pinching pad mounted thereon at spaced points on the circumference thereof, said member being rotatably mounted in a position such that said striking and pinching pads move into the path of said engaging pin; means for mounting a second pinching pad in the path of said engaging pin; a stop mounted to position said striking pad on said path whereby movement of said body causes said pin to rotate said member; and toggle means for urging said member to rotate in the same direction after initial movement under urging of said engaging pin to pinch said pin between said pinching pads.

References Cited in the file of this patent

UNITED STATES PATENTS

| | | |
|---|---|---|
| 252,581 | Hobert | Jan. 17, 1882 |
| 284,788 | White | Sept. 11, 1883 |
| 1,165,092 | Grunow | Dec. 21, 1915 |
| 1,418,313 | Long | June 6, 1922 |
| 2,471,568 | Harrison | Mar. 31, 1949 |